United States Patent [19]

Lockwood

[11] 4,305,266
[45] Dec. 15, 1981

[54] LOCKING APPARATUS FOR PORTABLE DEVICES

[76] Inventor: Robert G. Lockwood, 7311 E. Alondra Blvd., Paramount, Calif. 90723

[21] Appl. No.: 106,046

[22] Filed: Dec. 21, 1979

[51] Int. Cl.³ ............................................. E05B 73/00
[52] U.S. Cl. ....................................... 70/58; 248/553; 70/DIG. 57
[58] Field of Search .................... 70/57, 58, 229, 231, 70/232, DIG. 57; 248/551, 552, 553

[56] References Cited

U.S. PATENT DOCUMENTS 2,755,655  7/1956  Maffey ................................. 70/232
3,913,880  10/1975  Lucasey .............................. 248/553

Primary Examiner—Robert L. Wolfe
Attorney, Agent, or Firm—Edward E. Roberts

[57] ABSTRACT

A locking apparatus for portable devices and having a base member for securing to a surface, the base member having a conically tapered receptacle for rotatably receiving a similarly configured bearing plug of a base plate member configured for securing to a portable device. The bearing plug is provided with a reduced diameter portion in alignment with the lock pin of a key operated lock, movement of the lock pin into the neck portion retaining the base plate member relative to the base member while permitting rotation of the base plate member.

8 Claims, 6 Drawing Figures

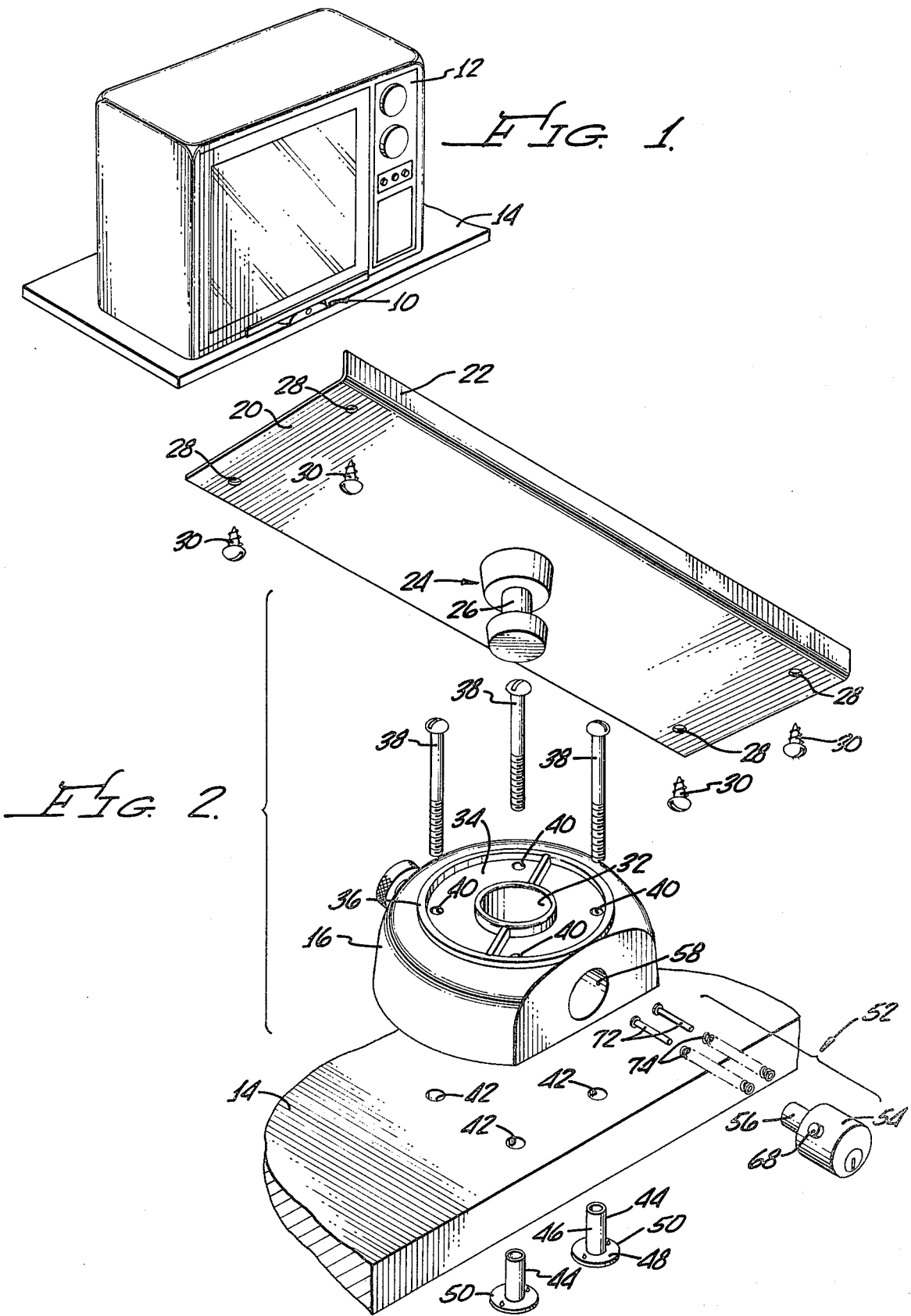

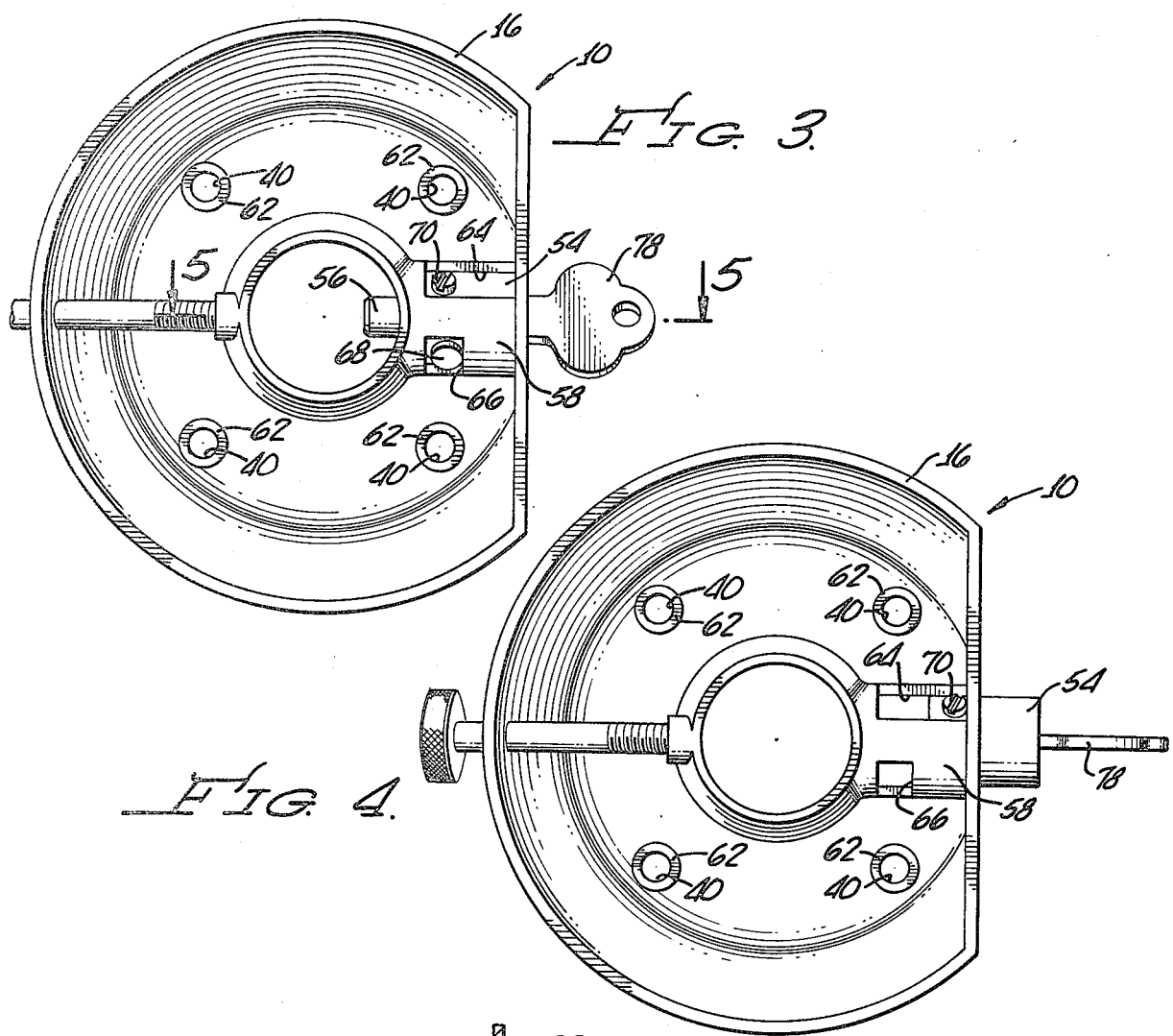
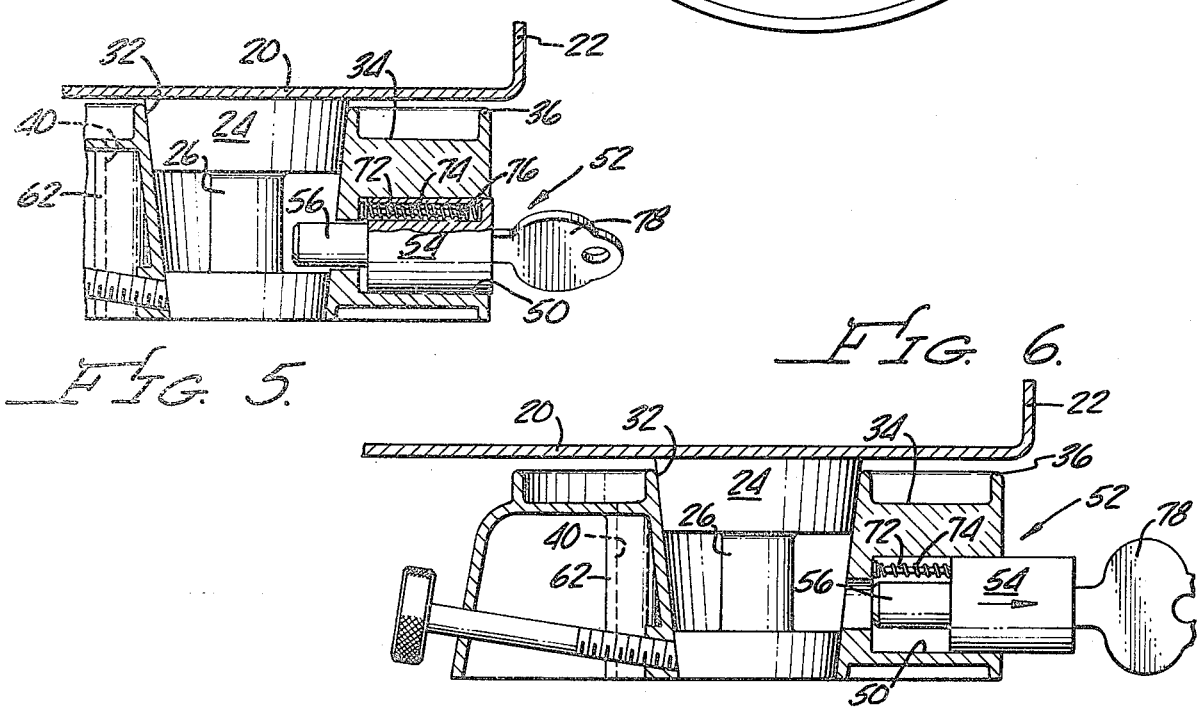

LOCKING APPARATUS FOR PORTABLE DEVICES

BACKGROUND OF THE INVENTION

The background of the invention will be discussed in two parts:

1. Field of the Invention

This invention relates to locking apparatus for portable devices, and more particularly to a locking apparatus for rotatably securing a portable device to a surface.

2. Description of the Prior Art

Property losses annually are extremely high with a significant percentage of the property losses arising due to theft of portable devices. In a business environment, the theft can extend to instruments used by technicians, calculators or other similar type portable devices.

In the home, in the hotel or motel businesses, such theft often extends to such portable appliances as televisions, stereo sets or the like.

With some such portable devices, if such devices are retained in a captive position, it is desirable that the mounting permit swiveling or rotating of the device during use. One such device in the prior art is shown and described in U.S. Pat. No. 3,067,976 to Popowitz issued Dec. 11, 1962 entitled: "Theft-Proof Television Swivel". The swivel unit for removal requires a special type spanner wrench, the component parts being bolted to connect the television set to a surface.

Another such apparatus is shown and described in U.S. Pat. No. 3,724,798 to Lucasey issued Apr. 3, 1973 entitled: "Stand for Supporting an Appliance". The particular structure shown in this patent requires that the stand be secured to the floor.

Another such device is shown as a "Mounting Means for Television Sets and the Like" issued to Keith, et al on Sept. 30, 1979, bearing U.S. Pat. No. 3,908,942. In the device of this patent, a mounting plate is secured to the bottom of the television set and a complementary supporting bearing plate is secured to a supporting means, the co-action between the two being by means of flanged brackets on one member engaging slots in the other member with relative rotation between the parts. The slotted member passes beneath the flanges to establish the interlock. The locking assembly is by means of a bolt.

Other such devices are shown in U.S. Pat. Nos. 3,936,026 (issued Feb. 3, 1976 to Hampel, et al) and 4,066,231 (issued Jan. 3, 1978 to Bahner). The first of these two patents illustrates a swivel base assembly for swiveling a portable device through an angle approximately 270° where the portable device has electrical cable passing through the swivel. The other patent is directed to a locking stand for small portable devices in which a cable passes through an opening in the supporting surface with a bar rigidly attached to the cable, the bar being accessible beneath the supporting surface for securing a nut and a padlock thereto.

Such prior art devices have generally used nuts and bolts as the securing means, or required special tools for removal of the device.

It is an object of the present invention to provide new and improved locking apparatus for portable devices.

It is another object of the present invention to provide a new and improved locking apparatus for a portable device such as a television set in which a key operated lock is used as the locking mechanism for readily separating the parts.

It is a further object of the present invention to provide a new and improved apparatus permitting full rotation and utilizing a plug or thrust bearing for enabling the support of heavy devices or appliances.

SUMMARY OF THE INVENTION

The foregoing and other objects of the invention are accomplished by providing a locking apparatus for portable devices, the apparatus including a base member configured for securing to a surface, the base member having a receptacle configured for rotatably receiving a bearing plug of a base plate member. The bearing plug is provided with a reduced diameter neck portion and a locking member mounted within the base member is movable into the neck portion for retaining the base plate member relative to the base member while permitting relative rotation therebetween. The bearing plug is generally frustoconically shaped for mating engagement with the receptacle.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a perspective view of a television set mounted for rotation relative to a surface by means of the locking apparatus according to the invention;

FIG. 2 is an exploded perspective view illustrating the locking apparatus according to the invention;

FIG. 3 is a bottom plan view of the base member of the locking apparatus of FIG. 1 with the locking pin of the lock in its engaged position;

FIG. 4 is a bottom plan view of the base member of FIG. 3 with the locking pin of the lock in its disengaged position;

FIG. 5 is a cross-sectional view of the base member of FIG. 3 as viewed generally along line 5—5 thereof with the base plate member mounted thereon to depict the locking engagement of the parts; and FIG. 6 is a cross-sectional view similar to FIG. 5 with the locking pin out of engagement to permit separation of the assembly.

DESCRIPTION OF THE PREFERRED EMBODIMENT

Referring now to the drawings and particularly to FIG. 1 there is shown a locking apparatus generally designated 10 securing a television set 12 to a table or surface 14. As will hereinafter be described, the locking apparatus 10 is so configured and so constructed as to permit 360° rotation of the television set 12 relative to the surface 14. Furthermore, the parts are so dimensioned and so arranged as to provide minimum clearance between the bottom of the television set 12 and surface 14 to preclude insertion of tools or the like in an attempt to separate the parts. Furthermore, while a television set 12 is depicted, it is to be understood that the locking apparatus 10 may be utilized for any appliances or devices of a portable nature which are commonly subject to theft.

Referring now to FIG. 2, the locking apparatus 10 includes a base member 16 and a base plate member generally designated 18, the base plate member having a plate portion 20 which is generally planar and rectangular with an upwardly bent edge or lip 22 which, as can be seen in FIG. 1 engages the front edge of the appliance or television set 12 in close abutting relation.

Secured to the underside of the plate portion 20 of the base plate member 18 is a downwardly depending thrust bearing or plug bearing generally designated 24, the overall configuration being frusto-conical in shape with a reduced diameter neck portion 26 generally intermediate the upper and lower edges thereof. The plate portion 20 of the base plate member 18 is provided with a plurality of apertures 28, two of each being positioned near the opposite long edges of the plate portion 20 for passage therethrough of suitable fastening means such as screws 30 for securing the appliance or television set 12 to the base plate member 18. The plate portion 20 of the base plate member 18 may be formed for example from sheet metal or steel bent to form the lip or edge 22 and may take any convenient form for attachment to the desired device or article. The thrust bearing or plug bearing 24 may be a machined or cast metal suitably secured generally centrally relative to the length of the plate portion 20 by conventional means such as welding or fasteners.

The base 16 may take any convenient form but in the embodiment illustrated is a generally inverted cup-shaped member with a centrally disposed bearing sleeve or receptacle 32 formed therein, the receptacle 32 being configured for mating rotating engagement with the plug bearing 24, that is the receptacle 32 is tapered downwardly and inwardly (see FIGS. 5 and 6). The upper surface of the base member 16 is dished or recessed, the recess 34 generally surrounding the receptacle 32 while being provided with a peripheral lip 36 which, with the base plate member 18 mounted thereon conceals the heads of mounting screws 38.

The base member 16 is provided with axially extending apertures 40 positioned within the recessed surface 34 with passage of the mounting bolts or screws 38 therethrough securing the base member 16 to the surface 14 with the heads of the screws 38 below the upper edge of lip 36. This mounting is accomplished by providing a plurality of apertures 42 in the surface 14 in alignment with the apertures 40 in the base member 16. For securing the base member, fasteners 44 conventionally known as pronged "T" nuts are provided. These T-nuts have a sleeve portion 46 and a flange portion 48, the sleeve portion 46 having an outer diameter generally equal to or smaller than the diameter of the apertures 42 for being received therein. The flanged portions 48 are provided with upwardly extending prongs 50 which engage the undersurface of the table or surface 14 for preventing removal thereof with the screws 38 engaging the threaded openings within the sleeves 46.

A locking means generally designated 52 is provided for securing the base member 16 to the base plate member 18 in its assembled condition. The locking assembly 52 in the embodiment illustrated includes a lock with a generally cylindrical housing 54 having a locking pin 56 integral therewith, the housing 54 being received within an enlarged circular aperture or sleeve 58 formed integrally within base member 16. The housing 54 is axially movable within the opening or sleeve 58.

Referring to FIGS. 2 through 6, the locking means will now be discussed. The base 16 may be made of aluminum, steel, copper, brass or the like and in the embodiment illustrated is a cast inverted cup-shaped metal with the apertures 40 being provided with integral pillars 62 which have an overall height sufficient to extend to the bottom of base 16 (see FIGS. 5 and 6). The pillars 62 serve to add strength to the cast structure and if desired, the pillars 62 may be cast or extruded as a separate member to add strength and retain lock 58.

The sleeve 58 for retaining the locking mechanism 52 is likewise cast within the base 16 with the main direction of sleeve 58 being generally transverse to the axis of the receptacle 32. The sleeve 58 (see FIGS. 3 and 4) is provided with an elongate slot 64 and a generally rectangular opening 66. The surface of base 16 communicating with the opening of sleeve 58 is flattened, this flattened surface being positioned during mounting adjacent the front of the locking apparatus 10 as illustrated in FIG. 1.

As previously discussed, the cylinder housing 54 of the locking assembly 52 includes an integral locking pin 56 of a smaller diameter with the cylinder housing 54 axially movable within the sleeve 58. The outer surface of the cylindrical housing 54 is provided with a threaded aperture and a second opening through which extends a key-operated plunger 68 (see FIG. 3), the threaded aperture receiving a retaining set screw 70.

As illustrated in FIGS. 2, 5 and 6 the locking mechanism 52 is also provided with a pair of stiffening pins 72 which receive thereabout coil springs 74, the pins 72 and coil springs 74 fitting within a pair of axially extending recesses 76 formed in the cylindrical housing 54 of the locking assembly 52. It is understood that a single coiled spring would also suffice as well.

During assembly, with the key operated plunger 68 recessed within the cylindrical housing 54 by means of rotation of key 78, and with set screw 70 removed, the spring 74 and stiffener pin 72 are positioned within the recesses 76 (only one of which is shown). The cylindrical housing 54 is then inserted into the sleeve 58 with the threaded aperture aligned with the elongated slot 64 of sleeve 58. The retaining set screw 70 is then threaded into the aperture. The position of the locking mechanism 52 after initial assembly will be that shown in FIGS. 4 and 6, that is, with the locking pin 56 out of engagement with the receptacle 32. The cylindrical housing 54 is retained by means of the set screw 70 abutting against the end of the slot 64 with the springs 74 urging the cylindrical housing 54 to the right as viewed in FIGS. 4 and 6, that is outwardly relative to the receptacle 32.

With the plug bearing 24 of the base plate member 18 inserted into the receptacle 32 of the base member 16, locking is effected by urging the cylindrical housing 54 inwardly and rotating the key 78 until the key operated plunger 68 extends into the rectangular opening 66 of sleeve 58 thereby retaining the locking pin 56 in a position extended into the receptacle 32 as illustrated in FIG. 3. With the plug bearing 24 in position, this locked position is illustrated in FIG. 5 with the locking pin 56 extending into the receptacle 32 with the terminal end of locking pin 56 being in proximity to the reduced diameter neck portion 26. If one attempts to lift the device or television set 12, the base plate member 18 will rise until the lower flange of the plug bearing 24 engages locking pin 56 to thereby prohibit ready removal of the television set 12. A thumb screw is shown in FIG. 6 for locking the base plate into stationary position to prevent rotation of plate member 18.

Referring again to FIG. 2, the screws 30 utilized to fasten the television set 12 to the base plate member 18 may be flat headed screws with the apertures 28 being suitably countersunk so that the heads of the screws are flush with the undersurface of plate portion 20. Alternatively, special fasteners may likewise be utilized. Additionally, the pronged T-nuts 44 may be set within countersunk openings on the underside of surface 14 for retaining the base member 16 on surface 14. In this manner the threaded fasteners 44 will not be readily accessible to tools, and similarly, with the heads of the screws 38 within recess 34 of base member 16, the heads of the screws 38 will likewise be inaccessible.

With the coaction between the base member 16 and the swivel plug bearing 24 tapered, the locking apparatus 10 provides virtually no rattle during rotation of the device or television set 12. Also, by adjusting the degree of taper or reducing the circumference by means of flat areas, a greater or lesser coefficient of friction can be achieved between the base 16 and the base plate member 18. This will limit or prevent any unwanted rotation of the supported unit or television set 12 if the locking apparatus 10 is used in a moving vehicle. The tapered configuration likewise distributes the downward force of the weight of the unit or television set 12.

The reduced diameter neck portion 26 of the bearing plug 24 acts as a capture slot for receiving a locking pin 56 of a locking mechanism 52. While the locking mechanism has been illustrated as a plunger-type lock, the apparatus 10 with minor changes to the base 16 can also accomodate cam locks or tumbler locks where the movable portion of the lock, in the locked position, extends into this capture slot or the opening surrounding the reduced diameter neck portion 26.

The locking apparatus 10 as shown and described provides a compact unit having a low profile capable of supporting small as well as large and heavy portable units or devices in a practically immovable relation with a supporting surface when in the locked position while permitting rotation of the supported unit through an angle 360° relative to the supporting surface 14. While there has been shown and described a preferred embodiment, it is to be understood that various other adaptations and modifications may be made within the spirit and scope of the invention.

What is claimed is:

1. In an apparatus for locking a portable device to a surface, the combination comprising:
   a base plate member having a plate portion for securing the portable device to a surface thereof and a bearing plug having a frusto-conical configuration extending from the other surface thereof, said bearing plug having a reduced diameter neck portion;
   a generally inverted cup-shaped base member for securing to a surface, said base member having a receptacle matingly configured for rotatably receiving said bearing plug therein and an aperture extending generally transverse to and communicating with said receptacle;
   a plunger lock axially slidable within said aperture of said base member, said lock having a locking pin movable relative to said receptacle for extending therein adjacent said neck portion for retaining said base plate member relative to said base member while permitting relative rotation therebetween;
   said base member having a recess in the upper portion thereof about the perimeter of said receptacle and further including apertures extending through said recessed portion for passage therethrough of screw means with the heads thereof concealed from view with the apparatus in its assembled position; and
   said base member further having pillar portions in communication with the apertures for said screw means, said pillar portions terminating generally co-extensive with the bottom of said base member for providing strength to said base member when fastened to a surface.

2. The combination according to claim 1 wherein said bearing plug is secured generally centrally of said base plate member and said neck portion is generally intermediate the upper and lower edges of said bearing plug.

3. The combination according to claim 1 wherein said base member includes a thumb screw extending generally transverse to and communicating with said bearing plug for locking said bearing plug into stationary position to prevent rotation of said plate member.

4. In an apparatus for locking a portable device to a surface, the combination comprising:
   a base plate member having a plate portion for securing the portable device to a surface thereof and a bearing plug extending from the other surface thereof, said bearing plug having a reduced diameter neck portion;
   a base member for securing to a surface, said base member having a receptacle generally matingly configured for rotatably receiving said bearing plug therein and an aperture extending generally transverse to and communicating with said receptacle;
   lock means within said aperture of said base member, said lock means having a locking member movable relative to said receptacle for extending therein adjacent said neck portion for retaining said base plate member relative to said base member while permitting relative rotation therebetween;
   said base member having a recess in the upper portion thereof about the perimeter of said receptacle and further including apertures extending through said recessed portion for passage therethrough of screw means with the heads thereof concealed from view with the apparatus in its assembled position; and
   said base member further having pillar portions in communication with the apertures for said screw means, said pillar portions terminating generally co-extensive with the bottom of said base member for providing strength to said base member when fastened to a surface.

5. The combination according to claim 3 wherein said lock means is a plunger lock axially slidable within said aperture and said locking member is a locking pin.

6. The combination according to claim 5 wherein:
   said bearing plug has a frusto-conical configuration and said receptacle is matingly configured therewith; and
   said base member includes screw means extending generally transverse to and communicating with said bearing plug for locking said bearing plug into stationary position to prevent rotation of said plate member.

7. The combination according to claim 1 wherein said base plate member includes a lip portion on said plate portion for abuttingly engaging a leading edge of the portable device.

8. The combination according to claim 1 wherein said base member is a cast member and the aperture for receiving said lock is a sleeve portion cast integrally with said base member.

* * * * *